United States Patent Office 3,446,949
Patented May 27, 1969

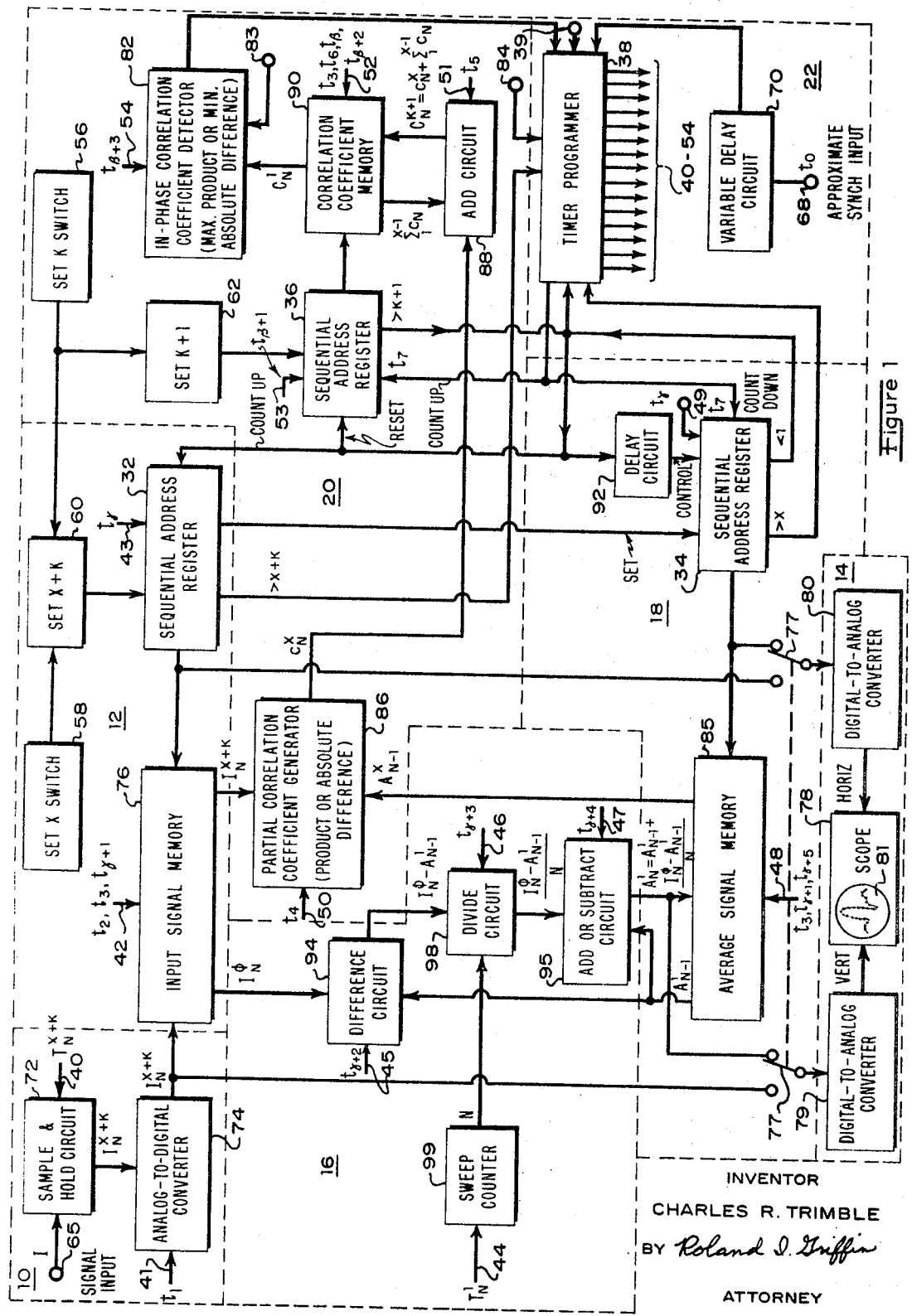

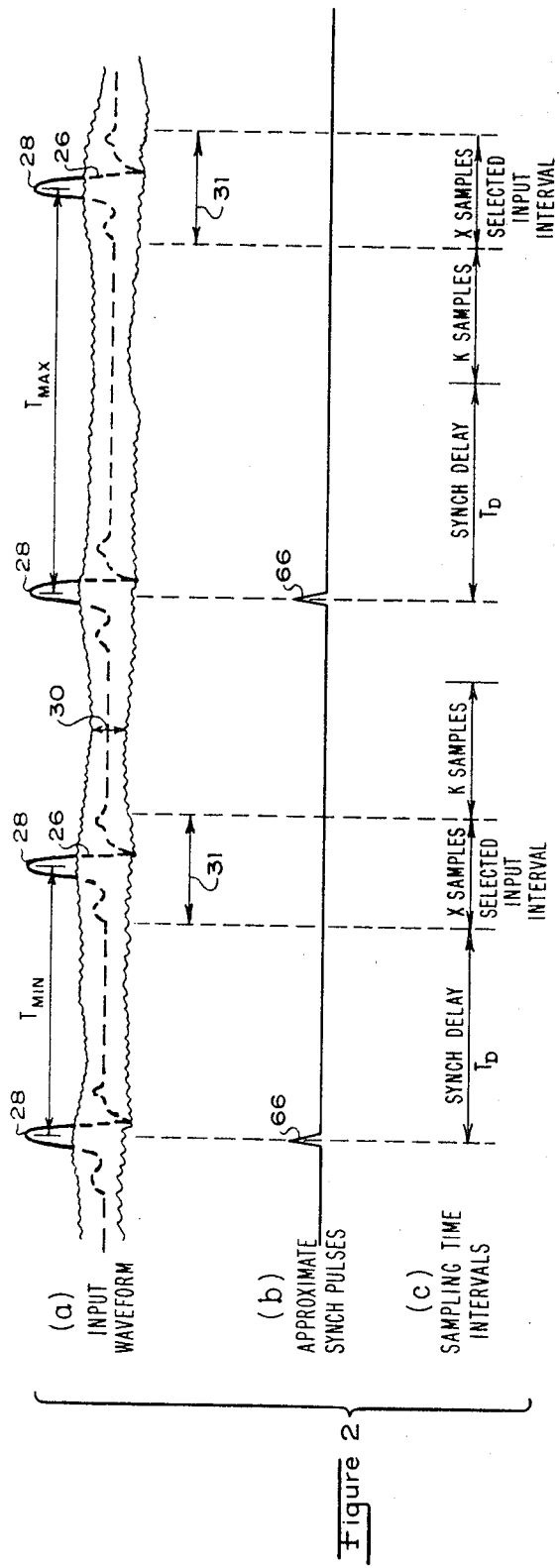
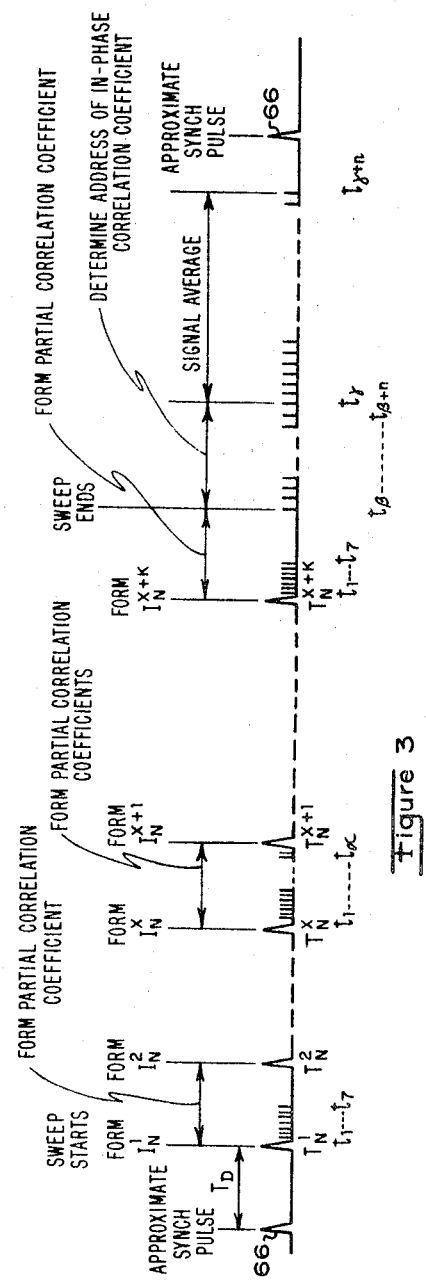

3,446,949
SIGNAL-TO-NOISE RATIO ENHANCEMENT
METHODS AND MEANS
Charles R. Trimble, Palo Alto, Calif., assignor to Hewlett-Packard Company, Palo Alto, Calif., a corporation of California
Filed Oct. 28, 1966, Ser. No. 590,273
Int. Cl. G06f 7/00
U.S. Cl. 235—152       14 Claims

ABSTRACT OF THE DISCLOSURE

A signal processing system for recovering repetitive signals from noise. A sweep is made wherein selected digitized amplitude samples are taken over a larger input interval than the selected input interval. As the first sweep is being stored, the operator determines with the aid of output display means, the set of amplitude samples that completely represent the selected input interval; this set is averaged and stored. Correlation means is provided for correlating each subsequent sweep with the averaged set so as to determine the set of each subsequent sweep that is most in phase with the average set. The signal averaging means processes each in-phase set to up-date the average set stored. As each new average is stored, it is displayed by the output display means to provide an on-line indication of the selected input interval with an enhanced signal-to-noise ratio.

---

This invention relates to methods and means for enhancing the signal-to-noise ratio of a selected interval of an electrical input waveform so as to permit observation and measurement of a signal component of interest contained within this selected input interval.

There are many situations in which an electrical input waveform contains a recurring signal component of interest that is obscured by a large noise component originating either in the electrical system or at the point of signal origin. Various methods and means for enhancing the signal-to-noise ratio of an input interval that contains the signal component of interest and that is selected for display are disclosed in Clynes' U.S. Patent 3,087,487 and in my own copending patent application Ser. No. 557,167 entitled, Signal-to-Noise Ratio Enhancement Methods and Means, and filed on June 13, 1966. These methods and means are based on the principle that the in-phase sum or average of a number of recurrences of the selected input interval more accurately represents the signal component of interest than any single recurrence of the selected input interval because the signal component contributes consistently to the sum or average while the unrelated noise component randomly adds to or subtracts from the sum or average. This principle is implemented by digitizing N recurrences of the selected input interval and by summing or averaging these digitized recurrences to provide an output in which for white Gaussian noise the signal-to-noise ratio is improved by $\sqrt{N}$. These methods and means are useful, however, only when synch pulses that are time locked to the input waveform can be generated (or found) to initiate in-phase digitization of the N recurrences of the selected input interval. When, for example, the signal component of interest and hence the selected input interval are quasi-periodic, that is, have a varying recurrence period of bounded duration, it may not be possible to generate (or find) these time-locked synch pulses with conventional synch circuitry and techniques.

Accordingly, it is the principal object of this invention to provide methods and means for enhancing the signal-to-noise ratio of the selected input interval in the absence of these synch pulses.

This object is accomplished in accordance with the embodiment of this invention illustrated in FIGURE 1 by providing sampling means, represented within the dashed block 10, for repetitively sampling and digitizing N input intervals, each of which is sufficiently larger than the selected input interval to allow for the quasi-periodicity of the signal component of interest and hence of the selected input interval. The sampling means 10 is operated at a rate to produce and digitize during each of these N input intervals $X+K$ amplitude samples completely representing that input interval. These $X+K$ amplitude samples are hereinafter referred to as a sweep. The selected input interval containing the signal component of interest is completely represented by a portion of this sweep comprising X consecutive amplitude samples. These X amplitude samples are hereinafter referred to as a set. Storage means, represented within the dashed block 12, is provided for storing each digitized sweep until it is replaced by the next digitized sweep. As the first sweep is being stored, the operator determines with the aid of output display means, represented within the dashed block 14, the set of the first sweep that completely represents the selected input interval. This set is then processed by signal averaging means, represented within the dashed block 16, to form an average of one recurrence of the selected input interval. Storage means, represented within the dashed block 18, is provided for storing this average until it is replaced by a new average. Correlation means, represented within the dashed block 20, is provided for correlating each subsequent sweep stored in the storage means 12 with the average (formed by processing the preceding sweep) then stored in the storage means 18 so as to determine the set of each subsequent sweep that is most in phase with that average. Each of these in-phase sets represents a recurrence of the selected input interval. The signal averaging means 16 processes each of these in-phase sets to update the average then stored in the storage means 18 and thereby form a new average related to the number of recurrences of the selected input interval that have been processed. As each new average is stored in the storage means 18, it is displayed by the output display means 14 to provide an on-line indication of the selected input interval with an enhanced signal-to-noise ratio. Timing means, represented within the dashed block 22, is provided for controlling the timing of each of the above described operations.

Other and incidental objects of this invention will be apparent from a reading of this specification and an inspection of the accompanying drawing in which:

FIGURE 1, already referred to above, is a block diagram of a signal-to-noise ratio enhancement system according to one embodiment of this invention; and FIGURES 2(a)–(c) and 3 are waveform and timing diagrams illustrating the operation of the system of FIGURE 1.

Referring to the drawing, there is shown in FIGURE 2(a) an input waveform including a quasi-periodic signal component 26 of interest, such as might be generated in response to the heartbeat of a patient. All of this signal component 26 but the peak 28 of the QRS complex may be obscured by a large noise component 30. The system of FIGURE 1 is hereinafter illustrated, for example, as it operates to enhance the signal-to-noise ratio of an input interval 31 that contains the signal component 26 of interest and that is selected for display.

Setting up the system

Initially, all of the logic blocks of the system are cleared and the sequential address registers 32, 34, and 36 are each set to the address of the first memory location associated therewith. This is done by a timer programmer 38 in response to a command pulse supplied to its reset input 39. Except for connections that could be shown without unduly complicating FIGURE 1, the timer programmer 38 is connected to the various logic blocks as indicated by the timer programmer outputs labeled 40–54 and by the logic block inputs correspondingly labeled 40–54. Each input and output of each logic block of the system, although represented by a single line for simplicity and clarity of illustration, comprises one or more wires as required by the function associated with that input or output and as will be apparent to those skilled in this art.

When the signal component of interest is so completely buried in noise that the operator cannot obtain any information about the signal component of interest, the system must be operated on substantially a trial and error basis until an output is obtained which is deduced to represent the signal component of interest. Even this trial and error mode of operation is facilitated by the correlation feature of the system, which, as summarily described above, determines the in-phase sets to be processed by the signal averaging means 16.

Commonly, however, as in the present illustration the operator has or can obtain sufficient information about the signal component 26 of interest so that the system may be set up to ensure enhancement of the signal-to-noise ratio of the selected input interval 31 containing the signal component of interest. By observing the input waveform the maximum and the minimum time intervals $T_{MAX}$ and $T_{MIN}$ between successive QRS peaks 28 are determined. The difference between these maximum and minimum time intervals represents a maximum time interval of uncertainty as to the position of the quasi-periodic signal component 26 of interest. The total time interval that must be sampled during each sweep is the sum of this maximum time interval of uncertainty and the time interval of the selected input interval 31. The timer programmer 38 is therefore set to supply sample timing pulses to the sampling means 10 at a rate $f_0$, that, taking into consideration the available memory locations, will provide a convenient and a complete representation of this total time interval. The product of the sampling period $1/f_0$ and the value of K to which the set K switch 56 may now be set defines the duration of the maximum time interval of uncertainty, and the product of the sampling period $1/f_0$ and the value of X to which the set X switch 58 may now be set defines the duration of the selected input interval 31. For on-line computation the system processing time between amplitude samples is proportional to the value of K. Thus, at high sampling rates $f_0$ (for example, above one kilohertz), $f_0$ and K cannot be chosen independently; either $f_0$ or K must be reduced to maintain on-line operation.

The address register 32 is set to sequentially address only $X+K$ of its associated memory locations, as required to store the selected sweep of $X+K$ amplitude samples, before overflowing and resetting to the address of its first associated memory location. This is done by a set $X+K$ circuit 60 in response to the settings of the switches 56 and 58. Each sweep of $X+K$ amplitude samples comprises $K+1$ sets of X consecutive amplitude samples, the first set beginning with the first amplitude sample of the sweep and each subsequent set beginning with the second amplitude sample of the preceding set. After the first sweep has been processed each set of each subsequent sweep must be correlated with the set then stored in the storage means 18 as an average of the in-phase set (or sets) of the preceding sweep (or sweeps) in order to determine the in-phase set of that subsequent sweep. Thus, $K+1$ correlation coefficients are generated during each sweep following the first sweep. The address register 36 is therefore set to sequentially address only $K+1$ of its associated memory locations, as required to store these $K+1$ correlation coefficients, before overflowing and resetting to the address of its first associated memory location. This is done by a set $K+1$ circuit 62 in response to the setting of the switch 56.

The input waveform of FIGURE 2(a) is now applied to the signal input 65 of the system. Conventional means are employed for generating a synch pulse 66 in response to every other QRS peak 28 as shown in FIGURE 2(b). Because of the quasi-periodicity of the heartbeat signal component 26, these synch pulses 66 are at best approximate synch pulses and are hereinafter referred to as such. Each approximate synch pulse 66 is applied to the approximate synch input 68 of the system. A variable delay circuit 70 is connected between the approximate synch input 68 and the timer programmer 38 and is adjusted for delaying application of each approximate synch pulse 66 to the timer programmer by the time interval $T_D$ as shown in FIGURE 2(c). This time interval $T_D$ is determined by subtracting the known (or estimable) time interval between the start of the heartbeat signal component 26 and its QRS peak 28 from the minimum time interval $T_{MIN}$ between successive QRS peaks 28, so that the selected input interval 31 will be completely represented by the first set of a sweep when successive QRS peaks 28 are separated by the minimum time interval $T_{MIN}$ and by the $(K+1)$th set of the sweep when they are separated by the maximum time interval $T_{MAX}$.

*Operation of the system*

Once the system is set up, it is ready to form and process N successive sweeps of the input waveform. Each sweep is formed and processed in response to application of an approximate synch pulse 66 to the timer programmer 38. Reference is now made particularly to FIGURE 1, which for illustrative purposes shows the system as it operates to form and process the $(X+K)$th amplitude sample $I_N^{X+K}$ of the Nth sweep (sample numbers being indicated by superscripts and sweep numbers by subscripts), and to FIGURE 3, which represents the time intervals following the time delay $T_D$ of each approximate synch pulse 66 that are required for processing the input waveform to form, correlate, and average a sweep (for illustrative purposes the Nth sweep) of $X+K$ amplitude samples. As will be apparent to those skilled in this art the timer programmer 38 generates one or more timing pulses during each of these time intervals as required to initiate the logic block functions hereinafter described as being associated with these time intervals.

The sampling means 10 is responsive to the timer programmer 38 for producing and digitizing each sweep of the input waveform applied to the signal input 65. Each sweep is formed by a sample and hold circuit 72 that is connected to the signal input 65. This sample and hold circuit 72 is responsive to the timer programmer 38 (via input 40) during each of the sampling time intervals $T_n^1, T_n^2 \ldots T_n^{X+K}$ for sampling the input waveform to produce an analog amplitude sample indicative of the average amplitude of the input waveform during that sampling time interval. Each sweep is digitized by an analog-to-digital converter 74 that is connected to the output of the sample and hold circuit 72. This analog-to-digital converter 74 is responsive to the timer programmer 38 (via input 41) during the first interval $t_1$ following each sampling time interval $T_n^1 \ldots T_n^{X+K}$ for digitizing the amplitude sample produced during that sampling time interval.

The storage means 12 includes an input signal memory 76, which is connected to the output of the analog-to-digital converter 74 for storing each digitized amplitude sample of each sweep until that amplitude sample is replaced by the corresponding amplitude sample of the next sweep. It also includes the sequential address register 32, which is connected to the memory 76 for sequentially selecting the $X+K$ consecutive memory locations required to store a sweep of $X+K$ amplitude samples as determined by the set X switch 58 and the set $X+K$ circuit 60. Each of these $X+K$ memory locations is associated with a different one of the sampling time intervals $T_n^1 \ldots T_n^{X+K}$ of each sweep. The input signal memory 76 is responsive to the timer programmer 38 (via input 42) during the second time interval $t_2$ following each sampling time interval $T_n^1 \ldots T_n^{X+K}$ for storing the amplitude sample produced during that sampling time interval (and digitized during the following time interval $t_1$) in the memory location associated with that sampling time interval. After each amplitude sample is stored in the memory location associated therewith, and before the next amplitude sample is produced, the sequential address register 32 is incremented to select the input signal memory location associated with the next amplitude sample as will hereinafter be described in detail.

Before the first sweep of $X+K$ amplitude samples is stored in the input signal memory 76 the operator actuates the ganged switches 77 to the alternate position from that shown in FIGURE 1 so as to connect the output display means 14 for providing an on-line indication of the first sweep as it is being stored in the memory 76. The output display means 14 comprises an oscilloscope 78 having its vertical input connected to the output of a digital-to-analog converter 79 and its horizontal input connected to the output of a digital-to-analog converter 80. With the ganged switches 77 in the above-mentioned position the digital-to-analog converter 79 is connected to the output of the analog-to-digital converter 74 for converting each digitized amplitude sample, as it is being stored in the input signal memory 76, to an equivalent analog signal that is supplied to the vertical input of the oscilloscope 78. Similarly, the digital-to-analog converter 80 is connected to the output of the address register 32 for converting each digital address, as it is selected by the address register 32, to an equivalent analog signal that is supplied to the horizontal input of the oscilloscope 78 as the time base for the corresponding analog amplitude signal supplied to the vertical input. The persistence of the cathode ray tube display 81 of the oscilloscope 78 is much longer than the time required to form and process a sweep. Thus, the operator may visually compare the contents of each location of the input signal memory 76 at the end of the first sweep to determine the approximate memory location in which the QRS peak 28 is stored. Since the time interval between the start of the heartbeat signal 26 of interest and its QRS peak 28 is known (or estimable) the operator may determine the address of the memory location in which the first amplitude sample of the set representing the selected input interval 31 is stored. The ganged switches 77 may now be actuated to the position shown in FIGURE 1, and the determined address set into an in-phase correlation coefficient detector 82 via its manual set input 83. This in-phase correlation coefficient detector 82 is connected to the timer programmer 38 for supplying the determined address to the timer programmer. The timer programmer 38 is responsive to the determined address when a command pulse is supplied to its manual set input 84 for initiating the signal averaging process by setting the address register 32 (via input 43) to the determined address and the address register 34 (via input 49) to the address of the first average signal memory location. Since the net result of this first signal averaging operation is merely to set the X consecutive amplitude samples representing the selected input interval 31 into the storage means 18 as an average of one recurrence of the selected input interval, the signal averaging process is best described in detail in connection with the processing of a subsequent sweep.

The storage means 18 includes an average signal memory 85, which is connected to the output of the signal averaging means 16 for storing the set of X digital average signals produced by processing each sweep until that set is replaced by a new set of X digital average signals produced by processing the next sweep. It also includes the sequential address register 34, which is connected to the memory 85 for sequentially selecting the X consecutive memory locations required to store a set of X digital average signals as determined by the set X switch 58. Each of these X memory locations is associated with a different one of the X digital average signals of the set produced by the signal averaging means 16. The average signal memory 85 is responsive to the timer programmer 38 (via input 48) following formation of each digital average signal for storing that average signal in the memory location associated therewith. After each digital average signal is stored in the memory location associated therewith, and before the next digital average signal is produced, the sequential address register 34 is incremented by the timer programmer 38 (via input 49) to address the average signal memory location associated with the next digital average signal of the set.

After the set of X digital average signals representing an average of one recurrence of the selected input interval 31 is stored in the first X locations of the average signal memory 85, the timer programmer 38 resets each of the address registers 32, 34, and 36 to the address of its first associated memory location. The system is now ready to form and process the next sweep in response to the next approximate synch pulse 66 supplied to the timer programmer 38. The remaining $N-1$ sweeps are each produced and digitized as already PARTIAL CORRELATION COEFFICIENTS OF Nth SWEEP

| $C_N^1$ | $C_N^2$ | $C_N^3$ | $\cdots\cdots\cdots\cdots$ | $C_N^{K+1}$ |
|---|---|---|---|---|
| $c_N^1 = (A^1{}_{N-1})(I_N^1)$ | | | | |
| $c_N^2 = (A^2{}_{N-1})(I_N^2)$ | $c_N^1 = (A^1{}_{N-1})(I_N^2)$ | | | |
| $c_N^3 = (A^3{}_{N-1})(I_N^3)$ | $c_N^2 = (A^2{}_{N-1})(I_N^3)$ | $c_N^1 = (A^1{}_{N-1})(I_N^3)$ | | |
| . | . | . | | |
| . | . | . | | |
| . | . | . | | $c_N^1 = (A^1{}_{N-1})(I_N^{K+1})$ |
| . | . | . | | $c_N^2 = (A^2{}_{N-1})(I_N^{K+2})$ |
| . | . | . | | . |
| $c_N^X = (A^X{}_{N-1})(I_N^X)$ | $c_N^{X-1} = (A^{X-1}_{N-1})(I_N^X)$ | . | | . |
| | $c_N^X = (A^X{}_{N-1})(I_N^{X+1})$ | $c_N^{X-1} = (A^{X-1}_{N-1})(I_N^{X+1})$ | | . |
| | | $c_N^X = (A^X{}_{N-1})(I_N^{X+2})$ | | : |
| | | | | : |
| | | | | : |
| | | | | $c_N^X = (A^X{}_{N-1})(I_N^{X+K})$ | described above. However, in order to determine the set of each of the remaining $N-1$ sweeps that is most in phase with the set of digital average signals then stored in the average signal memory 85 as an average of the in-phase set (or sets) of the preceding sweep (or sweeps), each of the $K+1$ sets of X consecutive amplitude samples of each remaining sweep is correlated with that set of digital average signals. This correlation is performed on-line by the correlation means 20 as illustrated with the aid of the above table, which for illustrative purposes indicates the $K+1$ correlation coefficients $C_N^1 \ldots C_N^{K+1}$ that are formed during processing of the $K+1$ sets of the Nth sweep (the set correlated by each correlation coefficient being indicated by a C superscript).

Each of these correlation coefficients $C_N^1 \ldots C_N^{K+1}$ comprises the sum of the set of X partial correlation coefficients $c_N^1 \ldots c_N^X$ in the adjoining column (the number of each partial correlation coefficient of each set being indicated by a c superscript) and is formed as described below.

The input signal memory 76 is connected to one input of a partial correlation generator 86 for nondestructively transferring the contents of the memory location addressed by the address register 32 to the partial correlation coefficient generator 86. Similarly, the average signal memory 85 is connected to another input of the partial correlation coefficient generator 86 for nondestructively transferring the contents of the memory location addressed by the address register 34 to the partial correlation coefficient generator 86. At the beginning of each sweep the address register 32 addresses the first location of the input signal memory 76, and the address register 34 addresses the first location of the average signal memory 85. Thus, during the third time interval $t_3$ following the first sampling time interval $T_N^1$ the input signal memory 76 and the average signal memory 85 are responsive to the timer programmer 38 for nondestructively transferring the first amplitude sample $I_N^1$ and the first average signal $A^1_{N-1}$ (the average signal number being indicated by an A superscript) to the partial correlation coefficient generator 86. The partial correlation coefficient generator 86 is responsive to the timer programmer 38 (via input 50) during the fourth time interval $t_4$ following the sampling time interval $T_N^1$ for forming a first partial correlation coefficient $c_N^1$. This first partial correlation coefficient $c_N^1$ is the first of X partial correlation coefficients required to form the first correlation coefficient $C_N^1$, which correlates the first of the $K+1$ sets of X amplitude samples of the Nth sweep with the set of average signals $A^1_{N-1} \ldots A^X_{N-1}$ then stored in the average signal memory 85. The partial correlation coefficient generator 86 operates either on the principle that on the average the product of a pair of signals in phase is larger than the product of the same signals out of phase or on the principle that on the average the absolute difference between a pair of signals in phase is smaller than the absolute difference between the same signals out of phase. Although the product principle of operation is illustrated in the above table, the absolute difference principle of operation permits a significant saving in hardware and processing time since the correlation coefficients may then be formed by subtraction rather than multiplication. The partial correlation coefficient generator 86 is connected to one input of an add circuit 88 for supplying the first partial correlation coefficient $c_N^1$, and every other partial correlation coefficient formed by the generator 86, to the add circuit 88. A correlation coefficient memory 90 is connected to the other input of the add circuit 88 for transferring the contents of the memory location selected by the address register 36 to another input of the add circuit 88. Since at the beginning of each sweep the first location of the correlation coefficient memory 90 was addressed by the address register 36, the memory 90 was responsive to the timer programmer 38 (via input 52) during the above-mentioned third time interval $t_3$ for transferring the contents of its first memory location to the add circuit 88. The add circuit 88 forms the sum of the first partial correlation coefficient $c_N^1$ and the contents of the first location of the correlation coefficient memory 90 in response to the timer programmer 38 (via input 51) during the fifth time interval $t_5$ following the sample timing interval $T_N^1$. Since the contents of each memory location of memory 90 are zero at the beginning of each sweep this sum is merely equal to the first partial correlation coefficient. The correlation coefficient memory 90 is connected to the output of the add circuit 88 for storing each sum formed by the add circuit 88 in the memory location selected by the address register 36. Thus, the correlation coefficient memory 90 is responsive to the timer programmer 38 (via input 52) during the sixth time interval $t_6$ for storing the first partial correlation coefficient $c_N^1$ in the first location of the memory 90. As determined by the set K switch 56 and the set $K+1$ circuit 62, the correlation coefficient memory 90 includes $K+1$ memory locations, each associated with a different one of the $K+1$ correlation coefficients required to correlate the $K+1$ sets of X consecutive amplitude samples of each sweep with the set of average signals stored in the average signal memory 85 during the preceding sweep. Each of these $K+1$ memory locations is used to store the cumulative sum of the X partial correlation coefficients required to form the one of the $K+1$ correlation coefficients that is associated with that memory location.

The timer programmer 38 is connected to a count up input of the address register 36 for incrementing the address register 36 by one address during the seventh time interval $t_7$ following the sampling time interval $T_N^1$ and is connected to a count down input of the address register 34 for decrementing the address register 34 by one address during this same seventh time interval $t_7$. An output of the address register 34 is connected: to the timer programmer 38 for preventing further incrementation of the address register 36 and decrementation of the address register 34 until the seventh time interval $t_7$ following the next sampling time interval $T_N^2$; to a reset input of the address register 36 for resetting the address register 36 to the address (selected at the beginning of the sweep) of the first correlation coefficient memory location, to the count up input of the address register 32 for incrementing this address register 32 by one address; and, via a delay circuit 92, to a control input of the address register 34 for permitting the address register 34 to be set to the address of the address register 32 once the address register 32 has been incremented by one address. This output of the address register 34 is activated only when the address register 34 is decremented past the address (selected at the beginning of the sweep) of the first location of the average signal memory 85 and is therefore referred to as the <1 output. The address register 32 is connected to a set input of the address register 34 for setting the address register 34 to the address of the address register 32 only when a signal is applied to the control input of the address register 34. Therefore, the decrementation of the address register 34 past the address of the first location of the average signal memory 85 during the above-mentioned seventh time interval $t_7$, or during any other time interval, prevents further incrementation of the address register 36 and decrementation of the address register 34 until after the next sampling time interval $T_N^2$; causes the address register 36 to address the first location of the correlation coefficient memory 90; causes the address register 32 to address the second location of the input signal memory 76; and causes the address register 34 to address the second location of the average signal memory 85. Thus, during the third time interval $t_3$ following the second sampling time interval $T_N^2$ the second amplitude sample $I_N^2$ and the second average signal $A^2_{N-1}$ are nondestructively transferred to the partial correlation coefficient generator 86 and the first partial correlation coefficient $c_N^1$ (of the first correlation coefficient) $C_N^1$ is transferred to the add circuit 88. During the fourth time interval $t_4$ following this second sampling time interval $T_N^2$ the partial correlation coefficient generator 86 forms the second partial correlation coefficient $c_N^2$ of the first correlation coefficient $C_N^1$, and during the fifth time interval $t_5$ the add circuit 88 forms the sum of this second patrial correlation coefficient and this first partial correlation coefficient. This sum is stored in the first location of the correlation coefficient memory 90 in place of the first partial correlation coefficient during the sixth time interval $t_6$. During the seventh time interval $t_7$ the address register 36 is incremented by one address and the address register 34 is decremented by one address. Thus, during the eighth time interval $t_8$ following the sampling time interval $T_N^2$ the second amplitude sample $I_N^2$ and the first average signal $A^1_{N-1}$ are nondestructively transferred to the partial correlation coefficient generator 86, and the content (initially zero) of the second location of the correlation coefficient memory 90 is transferred to the add circuit 88. The partial correlation coefficient generator 86 forms the first partial correlation coefficient $c_N^1$ of the second correlation coefficient $C_N^2$ during the ninth time interval $t_9$. The correlation coefficient $C_N^2$ correlates the second set of the Nth sweep with the set of average signals then stored in the average signal memory 85. During the tenth time interval $t_{10}$ the sum of the first partial correlation coefficient $c_N^1$ of the second correlation coefficient $C_N^2$ and the content (zero) of the second location of the correlation coefficient memory 90 is formed. This sum is stored in the second location of the correlation coefficient memory 90 during the eleventh time interval $t_{11}$. During the twelfth time interval $t_{12}$ following the sampling time interval $T_N^2$ the address register 36 is again incremented by one address and the address register 34 is again decremented by one address. This decrementation of the address register 34 past the address of the first location of the average signal memory 85 prevents further incrementation of the address register 36 and decrementation of the address register 34 until after the next sampling time interval $T_N^3$; causes the address register 36 to again address the first location of the correlation coefficient memory 90; causes the address register 32 to address the third location of the input signal memory 76; and causes the address register 34 to address the third location of the average signal memory 85. Thus, the system is ready to form and process the next amplitude sample associated with the third sampling time interval $T_N^3$.

After each amplitude sample is formed, it is processed in the same manner described in detail above so as to produce the partial correlation coefficients required to form each of the $K+1$ correlation coefficients $C_N^1 \ldots C_N^{K+1}$. However, two adjustments in the operation of the correlation means 20 must eventually be made. One of these adjustments is required because a point in the operation of the correlation means 20 is reached, beginning with processing of the amplitude sample $I_N^{K+2}$ produced during the sampling time interval $T_N^{K+2}$, where the address register 36 addresses its $(K+1)$th associated memory location before the address register 34 has been decremented to address its first associated memory location. Thus, an output of the address register 36 is connected: to the timer programmer 38 for preventing further incrementation of the address register 36 and decrementation of the address register 34 until the seventh time interval following the next sampling time interval $T_N^{K+3}$; to the reset input of the address register 36 for resetting the address register 36 to the address of its first associated memory location; to the count up input of the address register 32 for incrementing the address register 32 by one address; and, via the delay circuit 92, to the control input of the address register 34 for permitting the address register 34 to be set to the address of the address register 32 once the address register 32 has been incremented by one address. This output of the address register 36 is activated only when the address register 36 is incremented past the address of its $(K+1)$th memory location and is therefore hereinafter referred to as the $>K+1$ output. For example, the $>K+1$ output of the address register 36 is activated following storage in the $(K+1)$th correlation coefficient memory location of a partial correlation coefficient formed by processing the amplitude sample $I_N^{K+2}$ produced during the sampling time interval $T_N^{K+2}$. After activation of the $>K+1$ output the timer programmer 38 is prevented from further incrementing the address register 36 and decrementing the address register 34 until after the next sampling time interval $T_N^{K+3}$; the address register 36 is reset to its first associated memory location; the address register 32 is incremented by one address to its $(K+3)$th memory location associated with the sampling time interval $T_N^{K+3}$; and the address register 34 is set to its associated $(K+3)$th memory location.

The other of the above-mentioned adjustments is required because a point in the operation of the correlation means 20 is reached, beginning with processing of the amplitude sample produced during the sampling time interval $T_N^X$, where the address register 34 is set to address an associated memory location greater than its Xth associated memory location and hence where the address register 36 is reset to address an associated memory location in which a completed correlation coefficient is stored. When this happens the address register 34 must be reset to the address of its Xth associated memory location and the address register 36 must be set to the address of its memory location associated with the first incomplete correlation coefficient. The number of memory locations addressed by the address register 34 in excess of its Xth associated memory location is equal to the number of memory locations in which a completed correlation coefficient is stored. Thus, a $>X$ output of the address register 34 is connected to the timer programmer 38 for causing the timer programmer 38 to decrement the address register 34 and increment the address register 36 as required to reset the address register 34 to the address of its Xth associated memory location and concomitantly set the address register 36 to the address of its memory location associated with the first incomplete correlation coefficient. The required amount of decrementation of the address register 34 and hence of incrementation of address register 36 is determined by the number of addresses by which the set address of address register 34 exceeds its Xth associated memory location. As suggested by its name the $>X$ output is activated only when the address register 34 is set to an address greater than the address associated with its Xth memory location. For example, in processing the Xth amplitude sample $I_N^X$ produced during the sampling time interval $T_N^X$ the address register 36 is eventually reset to its first associated memory location, the address register 32 is incremented to address its $(X+1)$th associated memory location, and hence the address register 34 is set to address its $(X+1)$th associated memory location. The $>X$ output of the address register 34 is then activated causing the timer programmer 38 to decrement the address register 34 to its Xth associated memory location and to concomitantly increment the address register 36 by the same amount.

A $>X+K$ output of the address register 32 is connected to the timer programmer 38 and, as suggested by its name, is responsive to incrementation of the address register 32 past the address of its $(X+K)$th associated memory location for causing the timer programmer 38 to reset each address register 32, 34, and 36 to the address of its first associated memory location. This terminates the formation and correlation of the Nth sweep. The correlation coefficient memory 90 is connected to the in-phase correlation coefficient detector 82 for transferring the first correlation coefficient $C_N^1$ stored in the first memory location selected by the address register 36 to the detector 82 during the first time interval $t_\beta$ following termination of the Nth sweep. In response to the timer programmer 38 (via input 53) the address register 36 is incremented by one address during the next time interval $t_{\beta+1}$ so as to select the second location of the correlation coefficient memory 90. Thus, the correlation coefficient memory 90 transfers the second correlation coefficient $C_N^2$ stored in its second memory location to the in-phase correlation coefficient detector 82 during the time interval $t_{\beta+2}$. The detector 82 is responsive to the timer programmer 38 (via input 54) during the time interval $t_{\beta+3}$ for comparing the first and second correlation coefficient $C_N^1$ and $C_N^2$ to determine which one is the greatest product or the least absolute difference, depending on the principle of operation of the partial correlation coefficient generator 86. This operation of the address register 36, correlation coefficient memory 90, and in-phase correlation coefficient detector 82 continues until the detector 82 has compared all of the $K+1$ correlation coefficients $C_N^1 \ldots C_N^{K+1}$ stored in the memory 90 and has determined the most in-phase correlation coefficient, that is, the correlation coefficient comprising either the maximum product or the minimum absolute difference. The detector 82 is connected to the timer programmer 38 for supplying the address $\phi$ (where $\phi \leq K+1$) of this in-phase correlation coefficient $C_N^\phi$ to the timer programmer 38. The timer programmer 38 is responsive to this address $\phi$ during the time interval $t_\gamma$ for setting the address register 32 (via input 43) to the address of its $\phi$th associated memory location in which the first amplitude sample $I_N^\phi$ of the in-phase set of amplitude samples is stored and for setting the address register 34 (via input 49) to the address of its first associated memory location in which the first average signal $A^1_{N-1}$ is stored, thereby initiating signal averaging of this in-phase set of amplitude samples $I_N^\phi \ldots I_N^{\phi+(X-1)}$ with the set of average signals $A^1_{N-1} \ldots A^X_{N-1}$ stored in the average signal memory 85 during the $(N-1)$th sweep. This signal averaging is performed by the signal averaging means 16, which operates to enhance the signal-to-noise ratio of the selected input interval 31 by processing each amplitude sample of the in-phase set of each sweep in the same manner as illustrated below for the first amplitude sample $I_N^\phi$ of the in-phase set of the Nth sweep, where the address of the in-phase amplitude sample is indicated by a superscript.

The average signal memory 85 is connected to one input of a difference circuit 94 and to one input of an add or subtract circuit 95 and is responsive to the timer programmer 38 (via input 48) for nondestructively transferring the digital average signal $A^1_{N-1}$ stored in the memory location addressed by the address register 34 to the difference circuit 94 and to the add or subtract circuit 95 during the time interval $t_{\gamma+1}$. This digital average signal $A^1_{N-1}$ represents the average amplitude information obtained by signal averaging the first in-phase amplitude sample of the $(N-1)$th sweep. The input signal memory 76 is connected to another input of the difference circuit 94 and is also responsive to the timer programmer 38 (via input 42) during the time interval $t_{\gamma+1}$ for transferring the digital amplitude sample $I_N^\phi$ stored in the memory location addressed by the address register 32 to the difference circuit 94. In response to the timer programmer 38 (via input 45) the difference circuit 94 produces during the time interval $t_{\gamma+2}$ a digital difference signal $I_N^\phi - A^1_{N-1}$ indicating the difference between the first amplitude sample of the in-phase set of the Nth sweep and the first average signal of the set formed during processing of the $(N-1)$th sweep. The difference circuit 94 is connected for supplying this digital difference signal to a divide circuit 98. A sweep counter 99, which is responsive to the timer programmer 38 (via input 44) during the first sampling time interval $T_n^1$ of each sweep for sequentially changing states to produce an output signal indicating the number $n$ of the sweep, is connected for supplying this output signal to the divide circuit 98. In response to this sweep counter output signal the divide circuit 98 is set to subsequently divide a digital difference signal by the sweep number $n$. Thus, the divide circuit 98 is responsive to the timer programmer 38 (via input 46) during the time interval $t_{\gamma+3}$ for dividing the digital difference signal $I_N^\phi - A^1_{N-1}$ by N so as to produce the digital quotient signal $(I_N^\phi - A^1_{N-1})/N$. The divide circuit 98 is connected to another input of the add or subtract circuit 95 for supplying this digital quotient signal to the add or subtract circuit 95. In response to the timer programmer 38 (via input 47) the add or subtract circuit 95 algebraically adds the digital quotient signal $(I_N^\phi - A^1_{N-1})/N$ to the digital average signal $A^1_{N-1}$ so as to produce a new average signal $$A^1_{N-1} + (I_N^\phi - A^1_{N-1})/N$$

during the time interval $t_{\gamma+4}$. The average signal memory 85 is connected to the output of the add or subtract circuit 95 and is responsive to the timer programmer 38 (via input 48) during the time interval $t_{\gamma+5}$ for storing this new average signal back in the memory location selected by the address register 34. The timer programmer 38 then increments the address registers 32 and 34 by one address (via inputs 43 and 49) so as to initiate signal averaging of the next in-phase digital amplitude sample $I_N^{\phi+1}$ and thereby update the next digital average signal $A^2_{N-1}$. Processing each amplitude sample of each sweep in the above-described manner efficiently enhances the signal-to-noise ratio of the selected input interval 31 by correcting during each sweep the average amplitude information stored in each average signal memory location during the preceding sweep. A more detailed explanation of the principle of operation of the signal averaging means 16 may be obtained by referring to my aforementioned copending patent application Ser. No. 557,167 entitled Signal-to-Noise Ratio Enhancement Methods and Means and filed on June 13, 1966.

With the ganged switches 77 in the position shown the digital-to-analog converter 79 is connected to the output of the add or subtract circuit 95 for converting each new average signal formed by the signal averaging means 16 to an equivalent analog average signal, which is supplied to the vertical input of the oscilloscope 78. The digital-to-analog converter 80 is connected to the output of the address register 34 for converting each digital address selected by the address register 34 to an equivalent analog signal, which is supplied to the horizontal input of the oscilloscope 78 as the time base for the corresponding average signal supplied to the vertical input. Thus, a full-scale on-line output display of the selected input interval 31 is obtained by driving the oscilloscope 78 in synchronism with the above-described signal averaging process.

I claim:

1. A method for processing in phase a number of recurrences of a selected interval of an input waveform so as to enhance the signal-to-noise ratio of the selected input interval, said method comprising the steps of:
   forming and storing a plurality of input signals, each of said input signals representing a greater input interval than the selected input interval and including a portion representing a recurrence of the selected input interval;
   correlating each input signal with a reference signal representing at least one recurrence of the selected input interval to determine the portion of each input signal that is most in phase with the reference signal;
   processing the most in-phase portion of each input signal to form an average signal representing the average of a number of recurrences of the selected input interval;
   storing the average signal; and reading out the average signal to provide an output in which the signal-to-noise ratio of the selected input interval is enhanced.

2. A method as in claim 1 wherein for each input signal said correlating step includes:
  forming a plurality of correlation coefficients each correlating a different portion of that input signal and the reference signal; and
  scanning the correlation coefficients formed during correlation of that input signal to determine the correlation coefficient indicating the portion of that input signal that is most in phase with the reference signal.

3. A method as in claim 2 wherein the reference signal of said correlating step comprises the average signal formed during processing of the most in-phase portion of a preceding input signal.

4. A method as in claim 3 wherein for each input signal:
  said step of forming a plurality of correlation coefficients comprises for each correlation coefficient forming the product of a different portion of that input signal and the average signal formed during processing of the most in-phase portion of a preceding input signal; and
  said step of scanning the correlation coefficients comprises scanning the products formed during correlation of that input signal to determine the maximum product, said maximum product indicating the portion of that input signal that is most in phase with the average signal formed during processing of the most in-phase portion of a preceding input signal.

5. A method as in claim 3 wherein for each input signal:
  said step of forming a plurality of correlation coefficients comprises for each correlation coefficient forming the absolute difference between a different portion of that input signal and the average signal formed during processing of the most in-phase portion of a preceding input signal; and
  said step of scanning the correlation coefficients comprises scanning the absolute differences formed during correlation of that input signal to determine the minimum absolute difference, said minimum absolute difference indicating the portion of that input signal that is most in phase with the portion of a preceding input signal.

6. Apparatus for processing in phase a number of recurrences of a selected interval of an input waveform so as to enhance the signal-to-noise ratio of the selected input interval, said apparatus comprising:
  signal forming means for forming a plurality of input signals, each of said input signals representing a greater input interval than the selected input interval and including a portion representing a recurrence of the selected input interval;
  storage means coupled to said signal forming means for storing each input signal and a reference signal representing at least one recurrence of the selected input interval;
  correlating means coupled to said storage means for correlating each input signal with the reference signal to determine the portion of each input signal that is most in phase with the reference signal;
  signal averaging means coupled to said storage means for processing the most in-phase portion of each input signal to form an average signal representing the average of a number of recurrences of the selected input interval, said average signal being stored in said storage means; and
  output means coupled to said storage means for indicating the average signal to provide an output in which the signal-to-noise ratio of the selected input interval is enhanced.

7. Apparatus as in claim 6 wherein said correlating means comprises:
  correlation coefficient forming means for forming a plurality of correlation coefficients during correlation of each input signal, each of said correlation coefficients correlating a different portion of that input signal and the reference signal and being stored in said storage means; and
  scanning means for scanning the correlation coefficients formed during correlation of that input signal to determine the correlation coefficient indicating the portion of that input signal that is most in phase with the reference signal.

8. Apparatus as in claim 7 wherein the reference signal stored in said storage means is the average signal formed during processing of the most in-phase portion of a preceding input signal.

9. Apparatus as in claim 8 wherein:
  said correlation coefficient forming means forms each correlation coefficient during correlation of each input signal by forming the product of a different portion of that input signal and the average signal formed during processing of the most in-phase portion of a preceding input signal; and
  said scanning means scans the products formed during correlation of that input signal to determine the maximum product indicating the portion of that input signal that is most in phase with the average signal formed during processing of the most in-phase portion of a preceding input signal.

10. Apparatus as in claim 8 wherein:
  said correlation coefficient forming means forms each correlation coefficient during correlation of each input signal by forming the absolute difference between a different portion of that input signal and the average signal formed during processing of the most in-phase portion of a preceding input signal; and
  said scanning means scans the absolute difference formed during correlation of that input signal to determine the minimum absolute difference indicating the portion of that input signal that is most in phase with the average signal formed during processing of the most in-phase portion of a preceding input signal.

11. Apparatus as in claim 8 wherein said signal forming means includes: sampling means for sampling the input waveform to form each input signal, each of said input signals comprising a sweep of amplitude samples representing the greater input interval and including a set of amplitude samples representing a recurrence of the selected input interval.

12. Apparatus as in claim 11 wherein said correlation coefficient forming means includes means for forming at least one partial correlation coefficient of at least one correlation coefficient after each amplitude sample is formed and before the next amplitude sample is formed and for summing the partial correlation coefficients as they are formed so that the correlation coefficients correlating each sweep with the set of average signals formed during processing of the most in-phase set of amplitude samples of a preceding sweep are formed upon processing the last amplitude sample of that sweep.

13. Apparatus as in claim 12 wherein said signal averaging means comprises:
  difference means coupled to said storage means for forming during each sweep a plurality of difference signals, each of said difference signals representing the difference between an amplitude sample of the most in-phase set of that sweep and a corresponding average signal of the set of average signals formed during processing of the most in-phase set of amplitude samples of a preceding sweep; and
  means coupled to said difference means and to said storage means for dividing each difference signal produced by said difference means by a selected factor and for algebraically adding the resultant quotient signal to the above-mentioned corresponding average signal, the new average signal thereby formed being stored in said storage means as the reference signal for correlation of the next sweep.

14. Apparatus as in claim 13 wherein the selected factor by which each difference signal is divided is the sweep number.

References Cited

UNITED STATES PATENTS

| | | | |
|---|---|---|---|
| 3,087,487 | 4/1963 | Clynes | 128—2.1 |
| 3,388,377 | 6/1968 | Folsom et al. | 340—146.1 |

EUGENE G. BOTZ, *Primary Examiner.*

U.S. Cl. X.R.

235—150.53, 156, 181